UNITED STATES PATENT OFFICE.

ALFRED B. JENKINS AND CHARLES JENKINS, OF BOSTON, MASSACHUSETTS.

VULCANIZED PLASTIC COMPOUND.

SPECIFICATION forming part of Letters Patent No. 232,974, dated October 5, 1880.

Application filed August 28, 1880. (No specimens.)

*To all whom it may concern:*

Be it known that we, ALFRED B. JENKINS and CHARLES JENKINS, citizens of the United States, residing at Boston, in the county of Suffolk and State of Massachusetts, have invented a certain Improvement in Vulcanized Plastic Compounds, of which the following is a full, clear, and exact description.

The nature of this invention consists in constructing a vulcanizable compound of diatomaceous silica or infusorial earth mingled with rubber and gutta-percha, or either, and such other matter as is necessary to vulcanize it, and in a vulcanized compound containing diatomaceous silica or infusorial earth.

The proportion of silica or infusorial earth and sulphur to the rubber and gutta-percha, or either, depends upon the use to which the improved material is to be put.

For an elastic valve-packing that will be indestructible upon contact of steam of any kind, hot water, coal-oil, hot or cold, or other fluid of a destructive nature, we prefer to use the following formula: twenty to fifty-five per cent. of diatomaceous silica or infusorial earth; thirty-five to fifty per cent. of rubber; five to twenty per cent. of sulphur.

We consider that gutta-percha for the purposes of this invention is an equivalent for india-rubber, and we may substitute it for india-rubber in the above formula, or we may use part india-rubber and part gutta-percha.

For pump-valves and other like uses, and for other articles now commonly made of vulcanized rubber, we prefer to use a larger quantity of rubber or gutta-percha and a smaller quantity of silica and sulphur, and the following formula is the one which we advise as the best to follow for this purpose: twenty to thirty per cent. of diatomaceous silica or infusorial earth; sixty to seventy-five per cent. of soft rubber; five to ten per cent. of sulphur.

Of course we consider that gutta-percha is equally an equivalent for the rubber in this formula, as in the first, and we may also use gutta-percha and rubber together, and we desire to state that we do not confine ourselves to the especial proportions herein indicated, but may vary them as circumstances may require, and merely name them to give the best result of our experimenting.

For the purpose of obtaining hard packing or goods of a tenacious character we prefer to use a larger proportion of silica and a larger proportion of sulphur; and for goods of ordinary use, made from this compound, we use less silica, less sulphur, and more rubber.

The ingredients other than the rubber or gutta-percha are to be finely powdered and intimately mixed together. They are then to be spread on the surface of the rubber or gutta-percha and rolled with it between heated rollers until they are thoroughly incorporated with the substance thereof. The mass is then to be molded in iron molds of proper shape and subjected to a vulcanizing heat, which varies according to the nature of the article molded or to the use to which it is to be put.

For indestructible packings, a vulcanizing heat due to a steam-pressure of sixty to seventy-five pounds, or even more, from three to five hours, should be employed.

For pump-valves, a vulcanizing heat due to a steam-pressure of forty to seventy-five pounds, from fifteen minutes to three hours, may be used.

The use of silica has this advantage over any refractory matter or filling that has been heretofore used with rubber or gutta-percha for packing and other articles, in that, from its porous nature, it readily mixes with the rubber or gutta-percha, and makes, when vulcanized, a homogeneous material which is very light and very compact, and which will stand a very high degree of heat.

The quantity of sulphur used, as compared with the quantity of rubber, is varied according as it is desired to obtain the texture of hard or soft rubber, about in the proportion that it is varied in making ordinary hard and soft rubber.

When the texture of hard rubber is provided the compound, it takes on a very high polish.

Having thus fully described our invention, we claim and desire to secure by Letters Patent of the United States—

1. The within-described compound, as a new article of manufacture, consisting of diatomaceous silica or infusorial earth, india-rubber and gutta-percha, or either, and sulphur, united by vulcanization, substantially as and for the purposes described.

2. The employment of diatomaceous silica or infusorial earth, substantially in the manner and for the purposes indicated.

ALFRED B. JENKINS.
CHARLES JENKINS.

Witnesses as to signature of A. B. Jenkins:
F. F. RAYMOND, 2d,
JOHN F. SEAMANN.

Witnesses as to signature of Charles Jenkins:
ADDIE L. FULLER,
E. A. FULLER.